(12) United States Patent
Chiaverini et al.

(10) Patent No.: US 11,317,130 B2
(45) Date of Patent: Apr. 26, 2022

(54) METHOD AND SYSTEM FOR CARRIER-INITIATED TRAFFIC TUNING AND COMMUNICATION OF SUBSCRIBER PARAMETERS

(71) Applicant: Verizon Patent and Licensing Inc., Washington, DC (US)

(72) Inventors: Marc Chiaverini, Randolph, NJ (US); Daniel Mindler, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 16/800,067

(22) Filed: Feb. 25, 2020

(65) Prior Publication Data

US 2020/0195981 A1    Jun. 18, 2020

Related U.S. Application Data

(63) Continuation-in-part of application No. 15/906,931, filed on Feb. 27, 2018, now Pat. No. 10,820,236.

(51) Int. Cl.

| | |
|---|---|
| *H04W 4/06* | (2009.01) |
| *H04W 4/50* | (2018.01) |
| *H04W 28/02* | (2009.01) |
| *H04W 28/16* | (2009.01) |
| *H04N 21/2385* | (2011.01) |
| *H04N 21/462* | (2011.01) |
| *H04W 28/20* | (2009.01) |
| *H04W 28/12* | (2009.01) |
| *H04M 15/00* | (2006.01) |

(52) U.S. Cl.
CPC ........ *H04N 21/2385* (2013.01); *H04M 15/66* (2013.01); *H04N 21/4621* (2013.01); *H04W 28/12* (2013.01); *H04W 28/20* (2013.01)

(58) Field of Classification Search
None
See application file for complete search history.

(56) References Cited

U.S. PATENT DOCUMENTS

| | | |
|---|---|---|
| 2010/0040134 A1 | 2/2010 | Sun |
| 2010/0149301 A1 | 6/2010 | Lee et al. |
| 2010/0205293 A1 | 8/2010 | Hu et al. |
| 2011/0200094 A1 | 8/2011 | Kalra et al. |

(Continued)

*Primary Examiner* — Duc T Duong

(57) ABSTRACT

A network device for a mobile carrier network sends, to a third-party platform, a first client message including a first parameter extension. The first parameter extension indicates subscription parameters for a data flow between a user equipment (UE) device that originated the first client message and the third-party platform. The network device receives, from the third-party platform, a server message. The server message does not include a confirmation that the third-party platform accepts subscription parameters. The network device forwards, to the UE device, the server message with the first parameter extension. The network device receives, from the UE device, a second client message including a second parameter extension. The second parameter extension confirms that the third-party platform accepts the one or more subscription parameters. The network device then generates a policy enforcement rule for the data flow that relies on the confirmation from the third-party platform.

20 Claims, 11 Drawing Sheets

(56) References Cited

U.S. PATENT DOCUMENTS

| | | | |
|---|---|---|---|
| 2011/0307935 A1* | 12/2011 | Kotecha | H04N 21/23439 |
| | | | 725/119 |
| 2012/0096130 A1* | 4/2012 | Wei | H04L 67/02 |
| | | | 709/219 |
| 2013/0144969 A1 | 6/2013 | Holden et al. | |
| 2015/0172161 A1* | 6/2015 | Isaksson | H04N 21/437 |
| | | | 725/95 |
| 2015/0195746 A1 | 7/2015 | Franklin et al. | |
| 2015/0256581 A1 | 9/2015 | Kolhi et al. | |
| 2016/0044529 A1* | 2/2016 | Pinheiro | H04L 69/40 |
| | | | 370/237 |
| 2016/0234078 A1* | 8/2016 | Jana | H04L 47/823 |
| 2016/0315867 A1 | 10/2016 | Hafez | |
| 2017/0150332 A1 | 5/2017 | Palanisamy et al. | |
| 2018/0160153 A1* | 6/2018 | Rajewski | H04L 65/4076 |
| 2018/0248806 A1* | 8/2018 | Burnley | H04L 65/602 |
| 2018/0331884 A1 | 11/2018 | Shaw et al. | |
| 2019/0104163 A1* | 4/2019 | Garrido | H04N 7/155 |

\* cited by examiner

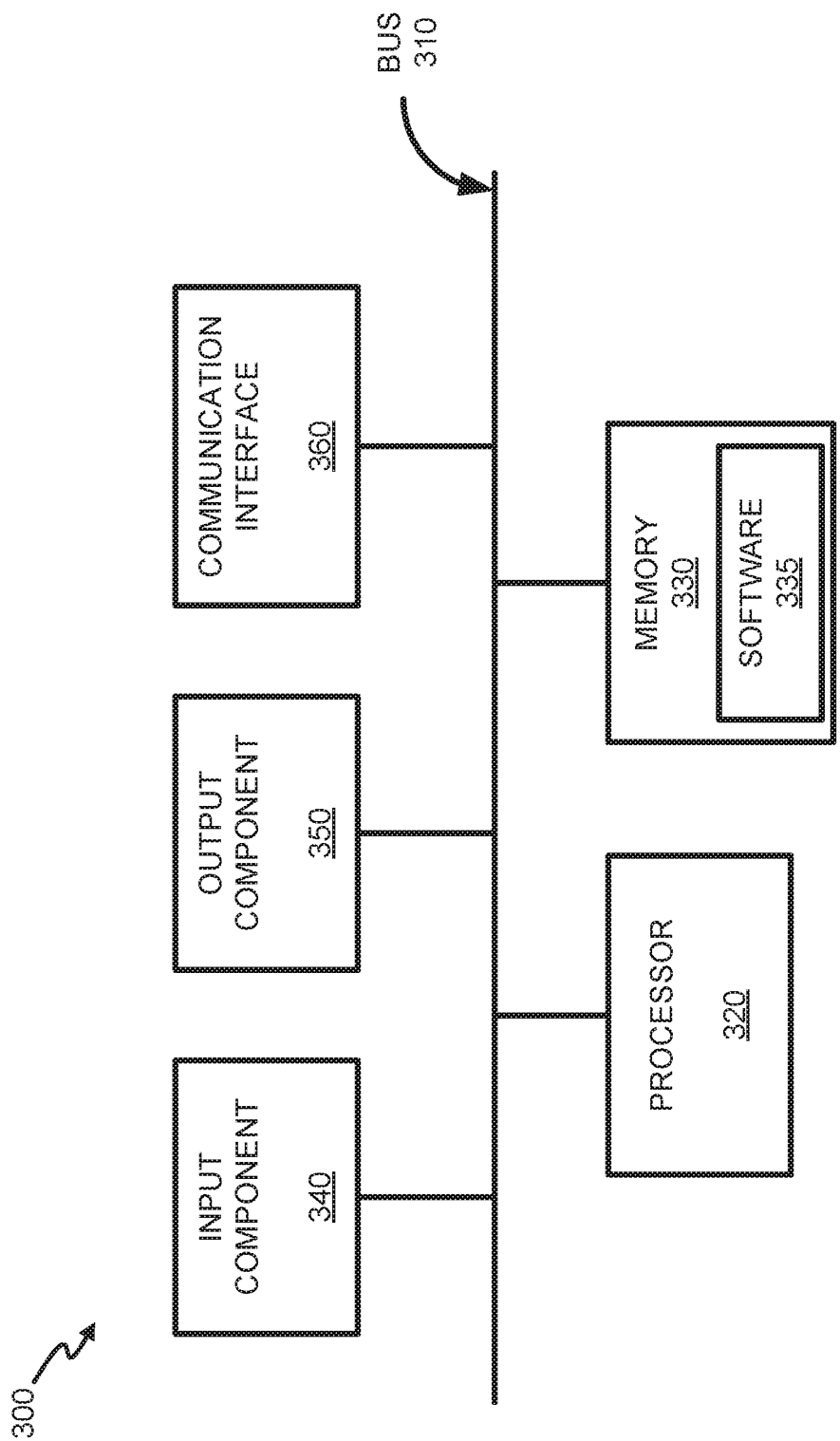

METHOD AND SYSTEM FOR CARRIER-INITIATED TRAFFIC TUNING AND COMMUNICATION OF SUBSCRIBER PARAMETERS

CROSS-REFERENCE TO RELATED APPLICATION

This application is a continuation-in-part of U.S. patent application Ser. No. 15/906,931, filed on Feb. 27, 2018, and titled "Method and System for Carrier-Initiated Traffic Tuning and Communication of Subscriber Parameters," the contents of which are incorporated herein by reference.

BACKGROUND

Mobile carriers can reduce the amount of network capacity used to support video by identifying video flows and limiting the amount of bandwidth available to these flows. These adjustments, sometimes referred to as throttling, may be used to apply parameters for a subscriber's account to a particular video flow and to manage network resources. Third party video services use adaptive techniques to determine how much bandwidth is available for a flow and adjust the video resolution to fit in the available bandwidth.

BRIEF DESCRIPTION OF THE DRAWINGS

FIG. 3 is a diagram of exemplary components that may be included in a device included in the network environment shown in FIG. 2;

DETAILED DESCRIPTION OF THE PREFERRED EMBODIMENTS

The following detailed description refers to the accompanying drawings. The same reference numbers in different drawings may identify the same or similar elements.

Figure 1:
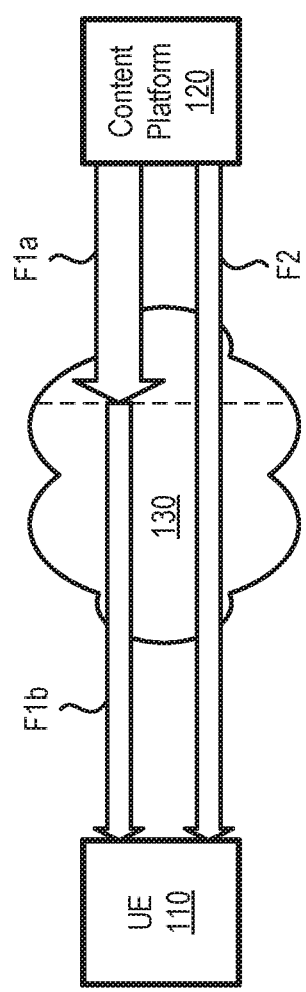
FIG. 1 is a schematic illustrating concepts described herein.

FIG. 1 provides a simplified illustration of concepts described herein. As shown in FIG. 1, a user equipment (UE) device 110 may receive content (e.g., video content, multimedia content, et.) from a content platform 120 via a mobile carrier's network 130. To manage network resources and differentiate between subscriber service levels, the mobile carrier's network 130 may reduce the amount of network capacity for video by identifying video flows and limiting the amount of bandwidth available to these flows over network 130. Third-party video service providers, represented by content platform 120, may adaptively determine how much bandwidth is available for a flow and adjust the video resolution to fit in the available bandwidth.

For example, as shown in FIG. 1, content platform 120 might use a default flow "F1a" with 1080p video resolution (i.e., where 1080 is the number of vertical rows of pixels in each video frame), which requires up to 10 Mbps to support that video resolution. If a network device of the mobile carrier wished to reduce the amount of video traffic required for this video stream, the network device might choose to limit this particular video flow to no more than 4 Mbps, which is delivered to UE 110 as flow "F1b." The content platform 120 will detect that the throughput is insufficient to support 1080p resolution and will switch to 720p resolution (i.e., where 720 is the number of vertical rows of pixels in each video frame), which will work correctly in the allotted 4 Mbps. By forcing content platform 120 to reduce the video resolution, the overall volume of data required for an hour of video, for example, is reduced significantly from 4.5 GB to 1.8 GB, even though the customer has watched the same video. As a result, network 130 has reduced the volume of traffic it must handle, while still providing the same (or comparable) quality of experience to the end user of UE 110.

Throttling of video (or other data) flows can be effective, but does not make optimal use of network resources. These throttling techniques rely on detection of network conditions by content platform 120 and subsequent adaptation of flows by content platform 120 to provide an adequate user experience. As described further herein in connection with FIG. 2, since the mobile carrier can only indirectly control the video resolution by throttling the video flow rate through network 130, neither content platform 120 nor network 130 can individually provide an optimized flow to UE 110 for parameters of the subscriber's account. For example, throttling may result in unused packets traversing a portion of the network before being discarded, may artificially extend download times for video streams with downgraded resolution, and can needlessly drain battery life of UE 110.

Instead of relying exclusively on throttling the rate of each individual data flow to reduce the data volume, implementations described herein allow network 130 and content platform 120 to proactively cooperate to limit video resolution based on a subscriber's parameters. Assuming there is cooperation between content platform 120 and network 130, an acceptable video resolution can be provided, shown as flow F2 in FIG. 1, without throttling by network 130 and subsequent adaptive techniques by content platform 120. Alternatively, if content platform 120 cannot or does not agree to provide flows within a subscriber's parameters, network 130 can still apply throttling techniques similar to flow F1a and F1b.

Thus, systems and methods described herein allow a mobile carrier to inform a content provider of data flow restrictions associated with a subscriber's account so that the carrier and the content provider can cooperate in real time or near real time to limit data flows without resorting to the inefficiencies of throttling by the carrier. According to implementations described herein, a network device of a mobile carrier network sends, to a third-party content platform, a client hello message including a first dedicated subscription parameter extension. The first dedicated subscription parameter extension indicates one or more subscription parameters for a data flow between a UE device that originated the client hello message and the third-party content platform. The network device receives, from the third-party content platform, a server hello message including a second dedicated subscription parameter extension. The second dedicated subscription parameter extension confirms the third-party content platform will abide by the one or more subscription parameters. The network device generates, based on the one or more subscription parameters, a policy enforcement rule for the data flow that relies, at least in part, on cooperation of the third-party content platform. As described further herein, the network device may apply the policy enforcement rule for the data flow between the UE device and the content platform to optimize traffic tuning more efficiently than can be achieved with conventional techniques, such as throttling.

While some implementations described herein are effective for some content platforms, other content platforms use different network architectures that prevent subscriber parameter information (e.g., a dedicated subscription parameter extension) from reaching the content platform servers. Particularly, some content platforms 120 employ load balancers or other network elements that either strip extensions (e.g., secure Hypertext Transfer Protocol (HTTPS) extensions) or terminate an HTTPS connection before subscriber parameter information reaches a particular content server.

Thus, according to another implementation, systems and methods described herein enable alternate communications to communicate subscriber parameters to a third-party content platform. Upon initial detection that subscriber parameter information are not reaching content servers in the content platform, a network device of the mobile carrier network may provide subscriber parameter information to a client application on the UE device. The client application may be configured to pass the subscriber parameter information through a secure connection with a content server in the content platform. The content server is then able to generate and send back to the client application a digitally signed acknowledgement of the subscription parameters, which the client application can then send to the network device of the mobile carrier to communicate the acknowledgement.

The acknowledgement of the subscription parameters confirms the third-party content platform will abide by the subscription parameters. The network device may then generate, based on the subscriber parameter information, a policy enforcement rule for the data flow, between the content server and the client application, which relies on cooperation of the third-party content platform.

Figure 2:
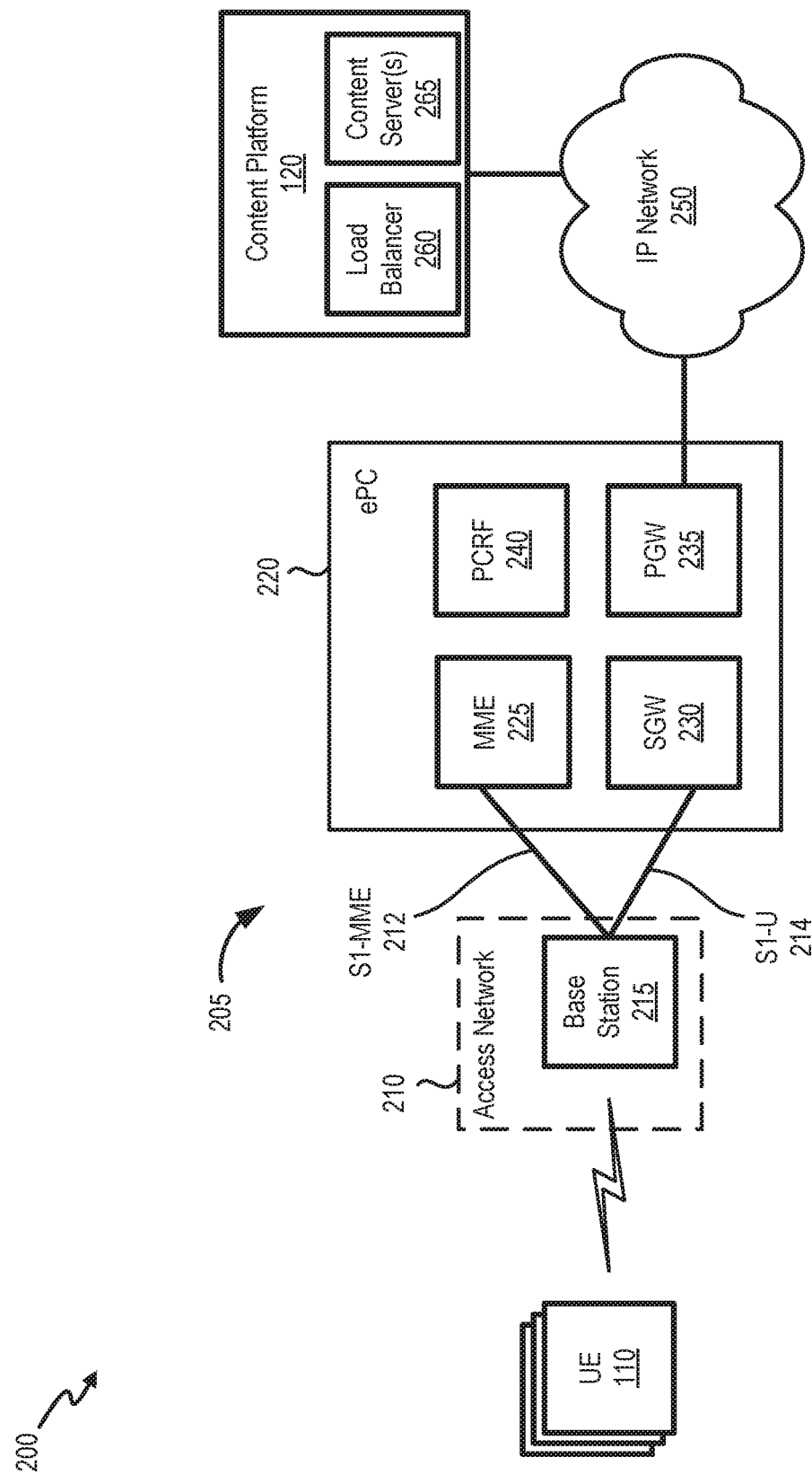
FIG. 2 is a diagram that depicts an exemplary network environment in which systems and methods described herein may be implemented.

FIG. 2 is a diagram that depicts an exemplary network environment 200 in which systems and methods described herein may be implemented. As shown in FIG. 2, network environment 200 may include a wireless network 205 with an evolved UMTS Terrestrial Network (eUTRAN) 210 and an evolved Packet Core (ePC) 220, an Internet Protocol (IP) network 250, a content platform 120, and multiple user equipment (UEs) 110 (referred to collectively and singularly as UE 110). FIG. 2 depicts a representative network environment 200 with exemplary components and configuration shown for purposes of explanation. Other embodiments may include additional or different network entities in alternative configurations than those presented in FIG. 2.

UE 110 may include a communication device configured to communicate with a base station (e.g., base station 215) via wireless signals. For example, UE 110 may include a portable communication device (e.g., a mobile phone, a smart phone, a global positioning system (GPS) device, and/or another type of wireless device); a personal computer or workstation; a server device; a laptop, tablet, or another type of portable computer; a media playing device; a portable gaming system; a machine-type communication (MTC) device; an Internet-of-Things device; and/or any type of mobile device with wireless communication capability. In one implementation, UE 110 may include a client-side application that enables UE 110 to communicate with, for example, content platform 120 and present information received from content platform 120 to a user (not illustrated). The client-side application may permit a user of UE 110 to log into an account, access catalog information, submit an order, and/or consume live streaming or downloaded video content (e.g., from content platform 120). According to an implementation described herein, UE 110 may initiate a Secure Socket Layer (SSL) or Transport Layer Security (TLS) handshake that enables an application on UE 110 (e.g., the client) and content platform 120 (e.g., the server) to establish the secret keys with which they communicate.

Content platform 120 may include one or more network or computational devices that provide content (e.g., multimedia content, video content, etc.) over IP network 250. Content platform 120 may include any type of web server, media repository, streaming source, network device, etc., that can provide UE 110 with content which is requested by a user. Content platform 120 may provide any form of video, media, text, audio, image, etc., which can be requested by the user through UE 110. In one aspect, content device 120 may be associated with a third-party video service, including Internet-based video streaming services such as NETFLIX, HULU, APPLE TV, AMAZON, YOUTUBE, VIMEO, VUDU, etc. Moreover, content platform 120 may provide simultaneous broadcast of data to a plurality of UEs 110 using simulcast and/or multicast techniques, such as, for example, any type of multimedia broadcast multicast service (MBMS) and/or evolved MBMS (eMBMS) over long-term evolution (LTE) standards. In one embodiment, UE 110 may provide a request for multimedia content or data to content platform 120 over wireless network 205. The request may be initially received by access network 210, and then forwarded through SGW 230 and PGW 235 to content platform 120 via IP network 250.

As described further herein, in some implementations, content platform 120 may include a load balancer 260 and multiple content servers 265. Load balancer 260 may include a network device to load balance the requests among multiple content servers 265. For example, load balancer 260 may assign a UE 110 to a particular content server 265 based on available resources, geography, number of assigned devices, cost metrics, etc. In one implementation, environment 100 may include multiple redundant content servers 265 (e.g., with geographic diversity). In some instances, content platform 120 may be configured to restrict client applications on UEs 110 from using HTTP connections. In other instances, load balancer 260 or another network element may either strip extensions (e.g., HTTPS extensions) or may terminate an HTTPS connection before UE 110 connects to a particular content server 265 that provides content to UE 110.

Wireless network 205 may be a long term evolution (LTE) 4G wireless network and may include one or more devices that are physical and/or logical entities interconnected via standardized interfaces. Wireless network 205 provides wireless packet-switched services and wireless IP connectivity to user devices (such as UE 110) to provide, for example, data, voice, and/or multimedia services. In other implementations, wireless network 205 may include an LTE Advanced (LTE-A) access network and/or any other network, such as a fifth generation (5G) access network.

Access network 210 may include one or more base stations 215. UE device 110 may wirelessly communicate with access network 210 via base station 215 when UE device 110 is located within the geographic area serviced by base station 215. In one implementation, access network 210 may use the Evolved Universal Terrestrial Radio Access (E-UTRA) air interface to wirelessly communicate with devices.

Base station 215 may include one or more devices and other components having functionality that allow UE 110 to wirelessly connect to access network 210 210. Base station 215 may interface with ePC 220 via an S1 interface, which may be split into a control plane S1-MME interface 212 and a data (or user) plane S1-U interface 214. S1-MME interface 212 may interface with MME device 225. S1-MME interface 212 may be implemented, for example, with a protocol stack that includes a non-access stratum (NAS) protocol. S1-U interface 214 may interface with SGW 230 and may be implemented, for example, using a General Packet Radio Service Tunneling Protocol version 2 (GTPv2).

ePC 220 may allow the delivery of Internet Protocol (IP) services to UE device 110, and may interface with other external networks. ePC 220 may include one or more server devices and/or network devices, or other types of computation or communication devices. As shown in FIG. 2, ePC 220 may include a mobility management entity (MME) device 225, a serving gateway (SGW) device 230, a packet data network gateway (PGW) device 235, and a policy and charging rules function (PCRF) device 240. In other implementations, ePC 220 may include additional network devices and functional components.

MME device 225 (also simply referred to as MME 225) may include a network device to implement control plane processing for ePC 220. For example, MME 225 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME 225 may also select a particular SGW 230 for a particular UE 110. A particular MME 225 may interface with other MME devices 225 (not shown) in ePC 220 and may send and receive information associated with UEs, which may allow one MME device to take over control plane processing of UEs serviced by another MME device, if the other MME device becomes unavailable.

SGW device 230 (also simply referred to as SGW 230) may include a network or computational device that provides an access point to and from UE 110, may handle forwarding of data packets for UE 110, and may act as a local anchor point during handover procedures between eNBs 215. SGW 230 may interface with PGW 235 (e.g., through an S5/S8 interface).

PGW device 235 (also simply referred to as PGW 235) may include a network or computational device that functions as a gateway to IP network 250. A particular UE 110, while shown in FIG. 2 connected to a single SGW 230, may, in some embodiments, be connected to multiple PGWs 235, one for each packet network with which UE 110 communicates. Typically, in response to PGW 235 receiving a create session request, PGW 235 may transmit a request (e.g., a charging and control request (CCR)) to PCRF device 240. In turn, PCRF device 240 may obtain a user access profile. The user access profile may include a session data flow (SDF) filter, a Quality-of-service (QoS) Class Identifier (QCI), an Allocation and Retention Policy (ARP), and/or other information. PCRF device 240 may transmit a response (e.g., a CCR response), which includes the policy and charging parameters, to PGW 235. In response to receiving the CCR response, PGW 235 applies the policies/charging parameters, applies the QoS profile to the prospective default EPS bearer, and transmits a create session response to SGW 230. PGW 235 may identify video flows and limit the amount of bandwidth available to these flows in accordance with a subscriber's parameters (also referred to as "throttling"). According to implementations described further herein, PGW 235 may also generate, insert, and/or validate subscription parameter extensions for client "hello" messages from UE 110 and server "hello" messages from content platform 120 based on, for example, subscription parameters obtained from PCRF 240.

PCRF device 240 (also simply referred to as PCRF 240) may include a network or computational device that provides policy control decision and flow based charging control functionalities. PCRF 240 may provide network control regarding service data flow detection, gating, QoS and flow based charging, etc. PCRF 240 may determine how a data stream is treated once mapped to a bearer, and may ensure that the user plane traffic mapping and treatment is in accordance with a user's subscriber profile. In one implementation, PCRF 240 may communicate with PGW 235 using a Gx interface.

IP network 250 may include one or multiple networks of one or multiple types. For example, IP network 250 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. IP network 250 may include, for example, an IMS network, which may provide data and multimedia services to UE 110, based on Session Initiation Protocol (SIP).

Devices and networks of environment 200 may be interconnected via wired and/or wireless connections. While FIG. 2 shows exemplary components of network environment 200, in other implementations, network environment 200 may include fewer components, different components, differently-arranged components, or additional components than depicted in FIG. 2. Additionally or alternatively, one or more components of network environment 200 may perform functions described as being performed by one or more other components of network environment 200.

Still referring to FIG. 2, applying throttling at PGW 235 presents several inefficiencies. For example, PGW 235 typically limits the video flow speed by discarding any packets that exceed the allowed speed for the flow. This means that the video provider (e.g., content platform 120) will send packets across the IP network 250 to ePC 220, which will then carry them across an IP backbone (not shown) until they reach PGW 235, where the excess packets will be discarded. Carrying excess packets all the way to PGW 235 before discarding them is inefficient for content platform 120, IP network 250, and ePC 220.

Furthermore, since PGW 235 is limiting the flow speed to an artificially low rate when throttling, the content platform 120 takes longer to transmit the entire video file to UE 110. Contrary to popular belief, video streaming is not usually implemented via real-time streaming. Instead, content platform 120 determines the available bandwidth, selects a video resolution, and then transmits the entire video file to UE 110 as quickly as possible. UE 110 then buffers the video and plays it out in real time for the user to watch. For the hypothetical example of a one-hour 1080p video, the video provider will transmit the 4.5 GB file to the user as quickly as possible. If access network 210 (e.g., a 4G LTE network) can achieve sustainable downlink transmit speeds of 20 Mbps (which is an attainable level of performance for 4G), the entire one-hour file could be transmitted to UE 110 in just a half hour (even though it would take the user an entire hour to watch the video). However, when PGW 235 limits the video flow throughput, the time required to transmit the entire file increases significantly. For the hypothetical 720p file of 1.8 GB, content platform 120 will take an hour to download the file to UE 110. Since each throttled file now takes longer to download, content platform 120 must support more simultaneous video downloads, and this degrades the capacity of content platform 120.

In a similar manner, the artificially limited flow speed also means that access network 210 will take longer to transmit the video file to the UE 110 (e.g., than if no throttling were applied). While the hypothetical 4.5 GB 1080p file could be transmitted in a half hour without throttling (assuming 20 Mbps throughput over access network 210), the 1.8 GB 720p file will take an hour to transmit with throttling to 4 Mbps. Even though the overall data volume is lower for the throttled case, the amount of time during which UE 110 will require a radio bearer is twice as long. This increased dwell time on access network 210 will actually increase the network cost for the carrier, decreasing the effectiveness of the video throttling solution.

As a another inefficiency of throttling in addition to those above, from the customer point of view, battery life of UE 110 may also be shortened and lead to degradation of UE 110 performance, since UE 110 would need to transmit and receive data over access network 210 for a longer period of time to transfer the video file.

Systems and methods described herein overcome the above-described inefficiencies of throttling in network environment 200 by enabling communication between PGW 235 and content platform 120 that allows for cooperative adjustment of video resolution in data flows. Still referring to FIG. 2, according to implementations described herein, a dedicated TLS extension (for HTTPS signaling) may be used to indicate to content platform 120 certain downlink data flow procedures associated with a particular client-side application residing on UE 110. According to one implementation, the dedicated TLS extension may include a subscription parameters extension used to regulate video resolution of video sent from content platform 120 to an application on UE 110. In other implementations, the subscription parameters extension may provide other types of parameters that, when communicated to content platform 120, can be used to tune application behavior for optimal user experience.

PGW 235 may add the subscription parameters extension to an application-generated client "hello" message that passes through the PGW 235 before being routed to content platform 120. PGW 235 analyzes each packet that passes through, and if PGW 235 determines that the client hello message is associated with a particular video application, PGW 235 can insert the subscriber's allowed video resolution (e.g., based on parameters obtained from PCRF 240) into the subscription parameters extension field in the client hello message. Content platform 120 can use the information in the subscription parameters extension to set the video resolution for the current session and then can also include a subscription parameters extension field in the server "hello" that is sent back to the application. The subscription parameters extension from content platform 120 may be used to acknowledge that content platform 120 has received the carrier's recommendation (from PGW 235) and that content platform 120 intends to accept the video resolution request. PGW 235 may receive the acknowledgement from content platform 120 and implement traffic policies based on the content platform 120's cooperation.

According to still another implementation, PGW 235 may detect that content platform 120 prevents TLS extensions (e.g., the subscription parameters extension) from reaching the applicable content servers 265. In response, PGW 235 may provide the subscriber parameter extension to the client application executing on UE 110. To receive content from content platform, UE 110 establishes an encrypted tunnel with a content server 265 in content platform 120. Using the encrypted tunnel, UE 110 may send the subscriber parameter extension to the content server 265, receive an acknowledgement extension from content server 265, and forward the acknowledgement extension to PGW 235. PGW 235 may receive the acknowledgement extension from UE 110 and implement policies based on the cooperation from content platform 120.

Using the previous example in which the user is only allowed to use 720p video resolution, according to embodiments described herein, UE 110 receives the same 720p video experience it would receive if throttling were applied, but now content platform 120 can transmit the 720p file at full speed (e.g., up to 20 Mbps). Content platform 120 can complete the video file download much more quickly (e.g., about 12 minutes for a 1.8 GB 720p file at 20 Mbps), reducing the service time on the video servers. Also, wireless network 205 will benefit significantly since UE 110 only needs to use a radio bearer over access network 210 for 12 minutes instead of a full hour. Both wireless network 205 and content platform 120 use finite network resources in an efficient manner, and UE 110 provides the user with the same quality of experience as a throttled delivery with lower battery drain.

FIG. 3 is a diagram illustrating exemplary components of a device 300. Device 300 may correspond, for example, to a component of UE 110, content platform 120, base station 215, MME 225, SGW 230, PGW 235, PCRF 240, load balancer 260, content server 265, or another component of network environment 200. Alternatively or additionally, UE 110, content platform 120, base station 215, MME 225, SGW 230, PGW 235, PCRF 240, load balancer 260, or content server 265 may include one or more devices 300 and/or one or more components of device 300.

Device 300 may include a bus 310, a processor 320, a memory 330 with software 335, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, with respect to the network elements that communicate using the designated TLS extensions described herein, these network elements may be implemented to include software 335. Additionally, for example, UE 110 may include software 335 (e.g., a client application to communicate with content platform 120, etc.) to perform tasks as described herein.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to UE 110, and receive RF signals over the air from UE 110. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. As another example, device 300 may include one or more switch fabrics instead of, or in addition to, bus 310. Additionally, or alternatively, one or more components of device 300 may perform one or more tasks described as being performed by one or more other components of device 300.

Figure 4B:
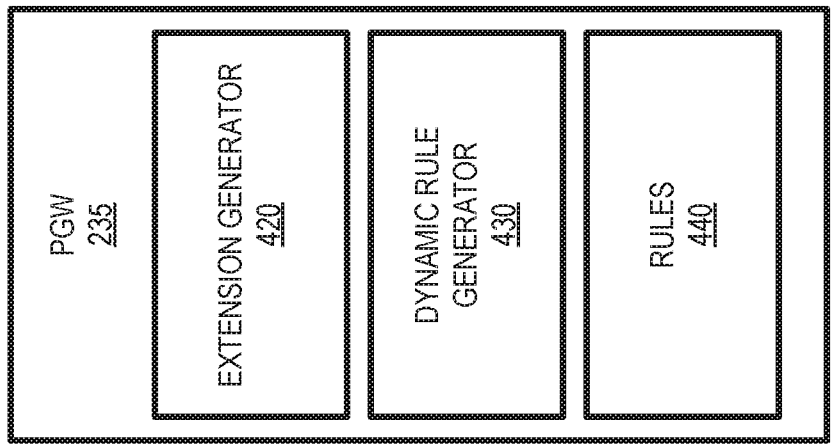
FIG. 4B is a block diagram illustrating exemplary components of the packet data network gateway (PGW) device of the network environment of FIG. 2.
Figure 4A:
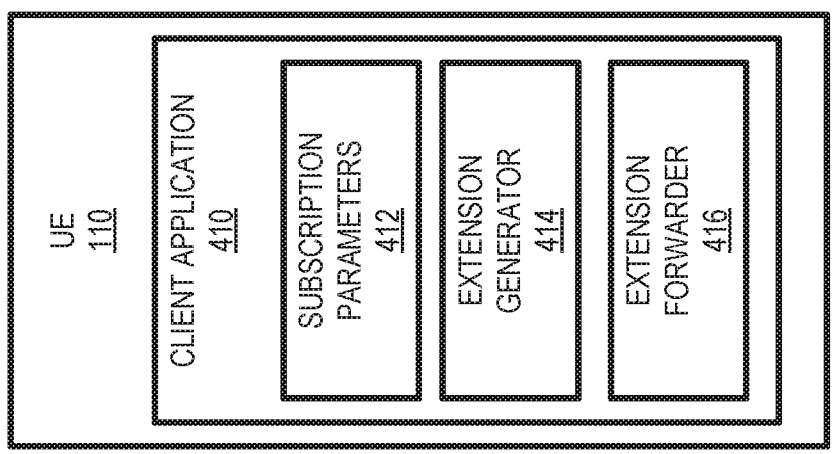
FIG. 4A is a block diagram illustrating exemplary components of the user equipment of the network environment of FIG. 2.

FIG. 4A is a block diagram illustrating exemplary logical components of UE 110, and FIG. 4B is a block diagram illustrating exemplary logical components of PGW 235. The functions described in connection with FIGS. 4A and 4B may be performed by one or more components of device 300 (FIG. 3). Some or all of the logical blocks of FIGS. 4A and 4B may be included, for example, in an application (e.g., software 335), stored in memory 330 and executed by processor 320. As shown in FIG. 4A, UE 110 may include a client application 410. As shown in FIG. 4B, PGW 235 may include extension generator 420, dynamic rule generator 430, and rules 440. Other configurations may be implemented. Therefore, UE 110 and PGW 235 may include additional, fewer and/or different logical components than those depicted in FIGS. 4A and 4B.

Referring to FIG. 4A, client application 410 may include a video application that enables UE 110 to present, to a user of UE 110, information received from content platform 120. Furthermore, client application 410 may coordinate with content platform 120 to obtain authorization and define parameters for user device 110 to access selected content. According to one implementation, client application 410 may be associated with a particular third-party content provider, such as the same third-party content provider that operates content platform 120.

In one embodiment, client application 410 may include subscription parameters 412, an extension generator 414, and an extension forwarder 416. Subscription parameters 412 may include parameters associated with content platform 120. For example, subscription parameters 412 may include video resolution parameters or charging parameters for streaming video content. According to one implementation, subscription parameters 412 may be provided to client application 410 using application program interface (API) calls to ePC 220. The APIs may be supplied to application developers via software development kits (SDKs) provided by the mobile carrier.

Extension generator 414 may generate extensions (e.g., dedicated TLS extensions for subscription parameters as described further herein) to initiate dynamic policies based on subscription parameters 412.

Extension forwarder 416 may be used to communicate subscription parameters and acknowledgements between wireless network 205 and content platform 120 when content platform 120 initially prevents TLS extensions from reaching the applicable content servers 265. Extension forwarder 416 may receive an extension (e.g., a dedicated TLS extension for subscription parameters as described further herein) from ePC 220 (e.g., PGW 235) and forward the extension to a content server 265 via an encrypted tunnel. Extension forwarder 416 may also receive an acknowledgement extension (e.g., confirmation hash) from content server 265 via the encrypted tunnel and forward the acknowledgement extension to ePC 220 (e.g., PGW 235).

Referring to FIG. 4B, extension generator 420 may generate TLS extensions to facilitate communications between PGW 235 and content platform 120. For example, extension generator 420 may detect a client hello message sent from a third-party client application (e.g., client application 410) on UE 110. Extension generator 420 may determine (e.g., based on rules 440 and/or communications with PCRF 240) that video resolution limits apply to a subscriber's policy (e.g., the subscriber using UE 110). Extension generator 420 may insert the subscriber's allowed video resolution into a dedicated extension field added on to the client hello message before forwarding the client hello message (with the dedicated extension field) to content platform 120. The dedicated extension field is described further in connection with, for example, FIG. 6A.

Dynamic rule generator 430 may detect a subscription parameter extension in a client hello message from UE 110 and/or a subscription parameter extension in a server hello message from content platform 120. Dynamic rule generator 430 may decrypt, validate, and/or interpret codes in the subscription parameter extensions and create/apply rules to implement the codes in the subscription parameter extensions. For example, in one implementation, dynamic rule generator 430 may receive a client hello message with a subscription parameter extension from UE 110 and later receive a confirmation hash of the subscription parameters in a server hello message with a subscription parameter extension from content sever 120. Dynamic rule generator 430 may use the confirmed subscription parameters to dynamically generate a rule to enforce the subscription parameters at PGW 235. Dynamic rules are described further in connection with, for example, FIGS. 5 and 7.

According to another implementation, when PGW 235 does not receive an acknowledgement extension with a confirmation hash, dynamic rule generator 430 may provide a subscriber parameter extension to client application 410 (e.g., extension forwarder 416) executing on UE 110. Dynamic rule generator 430 may later receive an acknowledgement extension from content server 265 via the client application 410. Dynamic rule generator 430 may verify the confirmation hash in the acknowledgement extension, and if acceptable, implement policies based on the cooperation from content platform 120.

Rules 440 may include locally-stored rules generated by dynamic rule generator 430 or other policy/profile-based rules retrieved from another network device (e.g., PCRF 240, etc.) that pertain to UEs 110.

Although FIGS. 4A and 4B shows exemplary logical components of UE 110 and PGW 235, in other implementations, UE 110 and PGW 235 may include fewer logical components, different logical components, or additional logical components than depicted in FIGS. 4A and 4B. For example, in another implementation, UE 110 may not include subscription parameters 412 or extension generator 414. Additionally or alternatively, one or more logical components of UE 110 and PGW 235 may perform functions described as being performed by one or more other logical components.

Figure 5:
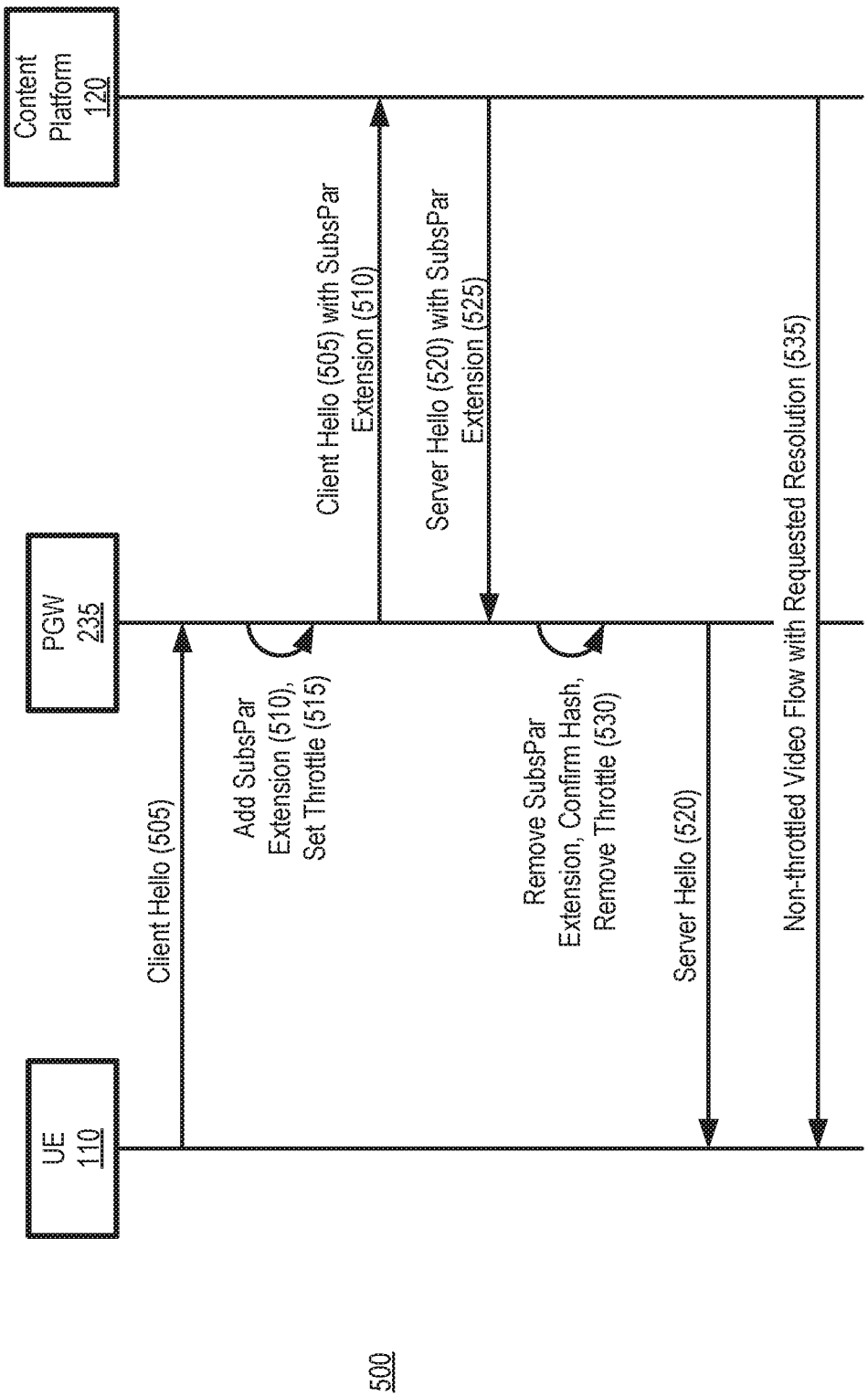
FIG. 5 is a diagram illustrating exemplary communications in a portion of the network environment of FIG. 2.

FIG. 5 is a diagram illustrating exemplary communications between devices in a portion 500 of network environment 200. Communications in FIG. 5 represent communications for providing subscriber account parameters from a mobile carrier network device (e.g., PGW 235) to a third-party network device (e.g., content platform 120). As shown in FIG. 5, network portion 500 may include UE 110, content platform 120, and PGW 235.

As shown in FIG. 5, UE 110 (e.g., client application 410) may direct a client hello message 505 to content platform 120. Client hello message 505 may be part of a TLS handshake protocol directed to a third-party video service as part of a message exchange for a login procedure, a video content request, a content catalog request, etc. Client hello message 505 may list cryptographic information such as the TLS version and the encryption formats supported by UE 110. Client hello message 505 may also contain a random byte string that is used in subsequent computations. Among other information, client hello message 505 may identify the application (e.g., client application 410) that initiates client hello message 505.

PGW 235 may inspect packets traversing from UE 110 to content platform 120. When PGW 235 determines that client hello message 505 is associated with a particular third-party video application (e.g., client application 410), PGW 235 may obtain (e.g., from PCRF 240) the subscription parameters for the data flow and insert the subscriber's allowed video resolution into a dedicated extension field (referred to herein as a "subscription parameters extension" or "SubsPar extension 510") that is added to the client hello message 505. SubsPar extension 510 is described further in connection with FIG. 6A.

Figures 6A, 6B:
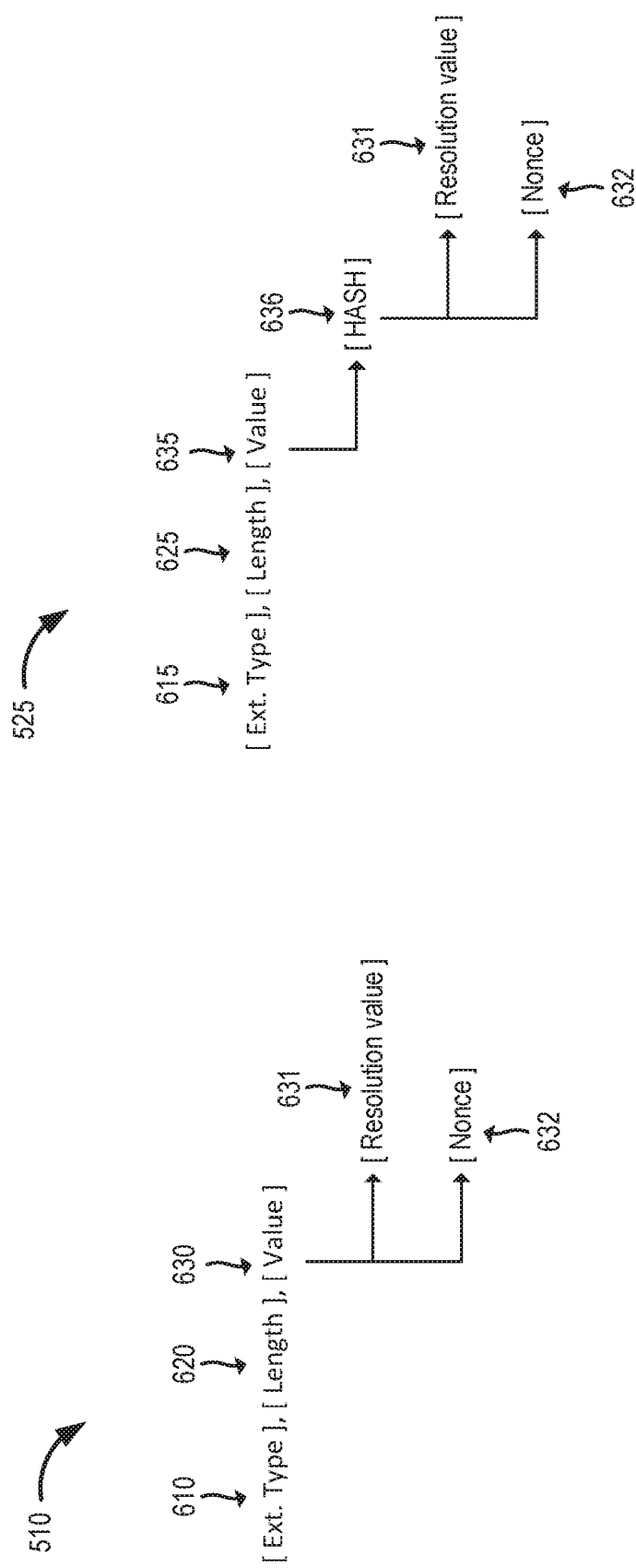
FIGS. 6A and 6B are diagrams showing exemplary format and parameters of dedicated subscription parameter extensions, according to an implementation.

FIG. 6A includes an example of format and parameters that may be used for a SubsPar extension 510 in client hello 505. As shown in FIG. 6A, SubsPar extension 510 may include a type parameter field 610, a length parameter field 620, and a parameter value field 630.

Type parameter field 610 may include a dedicated extension type value that indicates SubsPar extension 510. For example, type parameter field may include an extension type value that is assigned by the Internet Assigned Numbers Authority (IANA) and included in an upcoming IETF RFC. Length parameter field 620 may include a length (e.g., number of characters) used in all or part value field 630.

In one implementation, parameter value field 630 may include a video resolution value 631 (e.g., "480p," "720p," "1080p," etc., where each value represents the number of vertical pixels/lines in each video frame) that corresponds to the subscriber's allowed video resolution for UE 110. In other implementations, parameter value field may include another type of parameter that could be used by content platform 120 to tune client application 410 behavior for optimal user experience. Value field 630 may also include a nonce 632 (e.g., a randomly generated alpha-numeric string) for encryption purposes as described further below.

Returning to FIG. 5, as further shown at reference 510, PGW 235 may also set a throttle value 515 (e.g., bandwidth limit) for the subscriber's allowed video resolution. PGW 235 may append SubsPar extension 510 to client hello message 505 and forward the client hello message 505 with the SubsPar extension 510 to content platform 120.

Content platform 120 may receive client hello message 505 with SubsPar extension 510. Content platform 120 may use the information in SubsPar extension 510 to set the video resolution for the session. The video resolution may be, for example, a lower resolution than the default resolution for content platform 120. As part of the TLS handshake protocol, content platform 120 may provide a server hello message 520 to UE 110 (e.g., application 410). Server hello message 520 may include an encryption format (e.g., as selected from the encryption options provided in client hello message 505), a session ID, and another random byte string.

In response to SubsPar extension 510, content platform 120 may also include an acknowledgement SubsPar extension 525 with server hello message 520. SubsPar extension 525 may provide an acknowledgement (e.g., to PGW 235) that content platform 120 has received the carrier's video resolution recommendation in SubsPar extension 510 and that content platform 120 intends to adhere to the video resolution recommendation. Acknowledgement SubsPar extension 525 is described further in connection with FIG. 6B.

FIG. 6B includes an example of format and parameters that may be used for acknowledgement SubsPar extension 525 in server hello 520. As shown in FIG. 6B, acknowledgement SubsPar extension 525 may include type parameter field 615, a length parameter field 625, and a value field 635. Type parameter field 615 may include, for example, the same dedicated extension type value used for type parameter field 610. Length parameter field 625 may include a length (e.g., number of characters) used in all or part of value field 635. Length parameter field 625 may be the same value or a different value than length parameter field 620.

Value field 635 may include a hash value 636 generated from the video resolution value 631 and nonce 632 of value field 630 or another type of digital signature. Hash value 636 may be generated, for example, using a hash algorithm and private key previously exchanged with PGW 235.

Returning again to FIG. 5, to insure that no other parties can tamper with the extension-based communications between PGW 235 and content platform 120, SubsPar extensions 510/525 can be authenticated using cryptographic techniques. For example, PGW 235 may include a random nonce value 632 in value field 630 with SubsPar extension 510, and content platform 120 may digitally sign acknowledgement SubsPar extension 525 in the value field 635 of server hello message 520. In one implementation, the digital signature may include a hash 636 of the subscriber video resolution 631 and nonce 632.

As shown at reference 530, PGW 235 may receive server hello message 520 with acknowledgement SubsPar extension 525. PGW 235 may remove SubsPar extension 525 from server hello message 520 and forward server hello message 520 (without SubsPar extension 525) to UE 110. Thus, the carrier-to-video-service communication is not exposed to the end user.

When PGW 235 receives server hello message 520 with SubsPar extension 525, PGW 235 will also validate the digital signature (e.g., hash 636 in SubsPar extension 525) applying the same algorithm and private key used by content platform 120, and will accept the content platform 120 response in SubsPar extension 525 only if the digital signature is confirmed to be correct. This will prove that content platform 120 received the correct message from the PGW 235, and that the SubsPar extension 525 in server hello message 520 could only have been generated by content platform 120.

Assuming the digital signature is validated and content platform 120 has confirmed it will limit the video resolution as per the carrier specification, PGW 235 may remove the throttle value 515 that was applied when client hello message 505 was detected. In one implementation, PGW 235 may generate a dynamic rule (e.g., that overrides a default throttling rule) to stop throttling for the particular session. Content platform 120, as shown at reference 535, may then provide a non-throttle video flow with the requested resolution for the subscriber's account. Thus, by cooperating with the subscription parameters from PGW 235, content platform 120 may use the requested video resolution to transmit the entire video file to UE 110 as quickly as possible. UE 110 may then buffer the video and present in real time for the user to watch.

If content platform 120 does not support the extension-based communication or if content platform 120 chooses not to honor the video resolution request, the lack of acknowledgement SubsPar extension 525 in server hello message 520 will inform PGW 235 that content platform 120 is not cooperating. Thus, normal video throttling procedures (e.g., triggered in response to client hello message 505) would continue.

The communications and signals explained and illustrated in FIG. 5 are exemplary and may not represent each and every signal that may be exchanged. Additionally, depending on the implementation of UE 110 and PGW 235, different signals may be used in some instances to provide subscriber account parameters as described herein.

Figure 7:
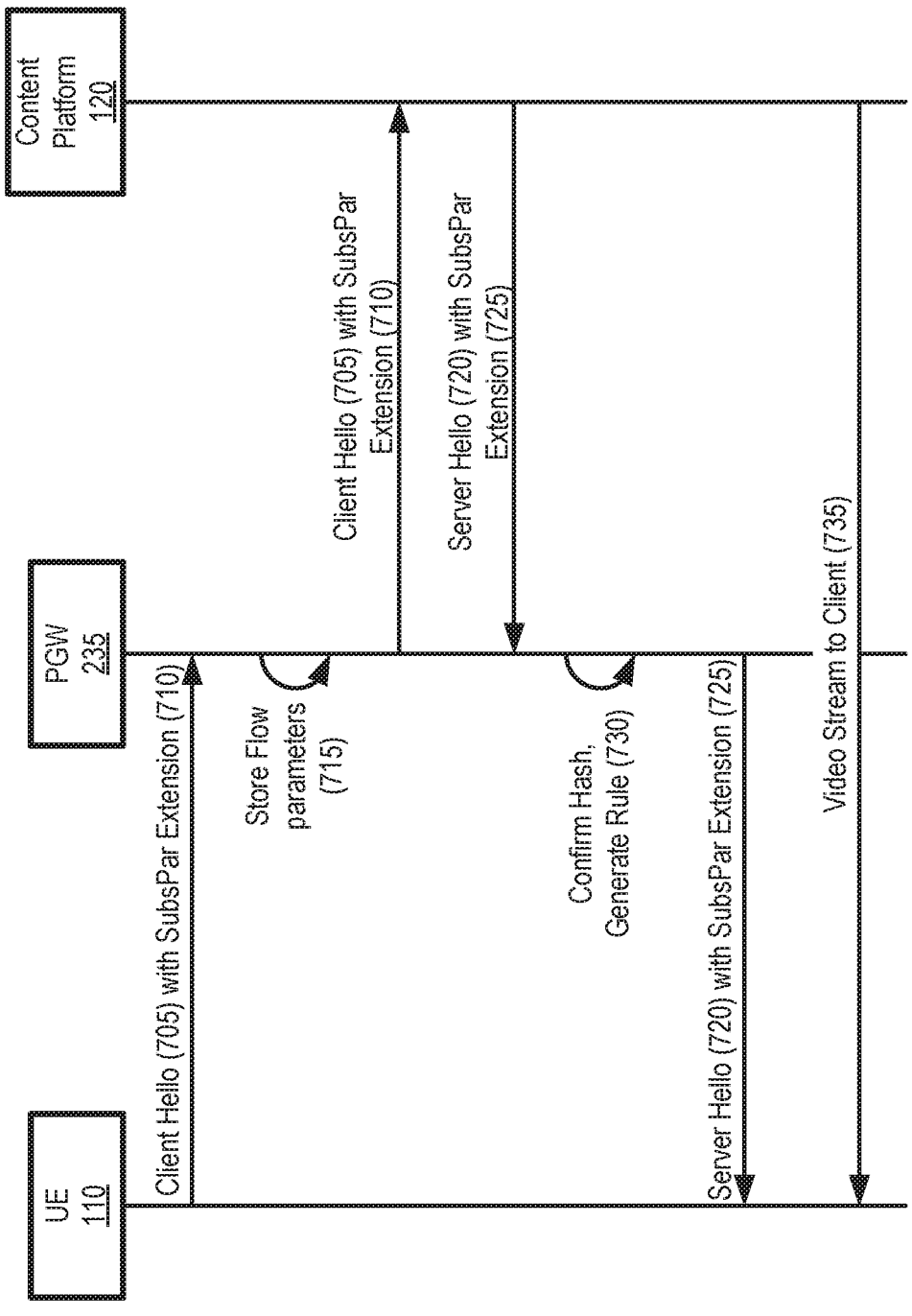
FIG. 7 is a diagram showing additional exemplary communications in the portion of the network environment of FIG. 2.

FIG. 7 is a diagram illustrating other exemplary communications between devices in portion 500 of network environment 200. Communications in FIG. 7 represent communications for subscriber account parameters from a UE device (e.g., UE 110) to a third party network device (e.g., content platform 120). Thus, in addition to the above-described insertion of subscriber parameters by PGW 235, a similar process may be applied using a trusted application (e.g., application 410) on UE 110. The trusted application on UE 110 can use a SubsPar extension in a client hello message to pass information through PGW 235 to content platform 120.

As shown in FIG. 7, UE 110 (e.g., application 410) may direct a client hello message 705 with a SubsPar extension 710 to content platform 120. Client hello message 705 may be part of a TLS handshake protocol directed to a third-party video service. Based on subscription parameters stored in application 410, UE 110 may insert particular parameters (such as parameters for sponsored data, different metering, video resolution limits, etc.) into a dedicated extension field, SubsPar extension 710, that is added to the client hello message 705. In one implementation, SubsPar extension 710 may set video resolution parameters, as described above in connection with FIG. 6A. In another implementation, SubsPar extension 710 may set other subscription parameters, such as charging parameter and/or time limits. SubsPar extension 710 is described further in connection with FIG. 8A.

Figures 8A, 8B:
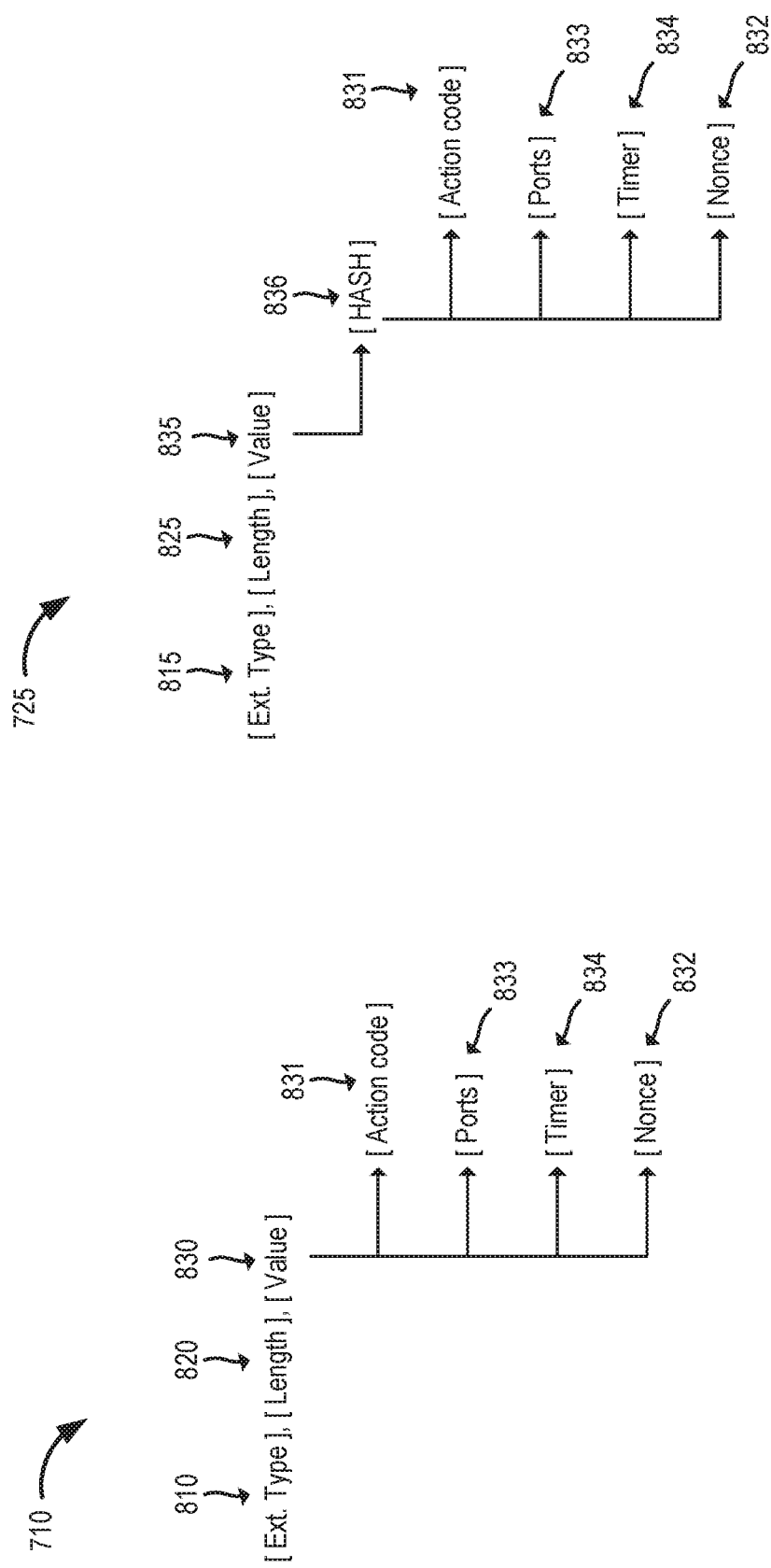
FIGS. 8A and 8B are diagrams showing exemplary format and parameters of dedicated subscription parameter extensions, according to another implementation.

FIG. 8A includes an example of format and parameters that may be used for a SubsPar extension 710 for client hello 705. As shown in FIG. 8A, SubsPar extension 710 may include a type parameter field 810, a length parameter field 820, and a parameter value field 830.

Type parameter field 810 may include a dedicated extension type value that indicates SubsPar extension 810, similar to type parameter field 610 described above. Length parameter field 820 may include a length (e.g., number of characters) used in all or part value field 830.

Parameter value field 830 may include an action code 831, source ports 833, and a timer 834. Value field 830 may also include a nonce 832 for encryption purposes.

Action code 831 may indicate a charging action, a metering action, sponsoring information, etc., for the data flow associated with a session. Action code 831 may include a code (e.g., an alphanumeric code) to indicate, for example, sponsored data (e.g., that is not billed to a subscriber's plan), a variation from a subscriber's default charging parameters, or another non-standard charging action. Source ports 833 may indicate particular ports (e.g., ports "5000:5005") to be used for the requested video session. Timer 834 may include a time limit (e.g., 15 minutes, 30 minutes, etc.) to which action code 831 and source ports 833 apply.

Returning to FIG. 7, PGW 235 may inspect packets traversing from UE 110 to content platform 120, including client hello message 705 with SubsPar extension 710. When PGW 235 may read SubsPar extension 710 and identify the charging action from action code 831, the source ports from source ports 833, and the time limit from timer 834. PGW 235 may store these values associated with application 410, as indicated by reference 715.

Content platform 120 may receive client hello message 705 with SubsPar extension 710. Content platform 120 may use the information in SubsPar extension 710 to confirm the subscriber parameters for the session. As part of the TLS handshake protocol, content platform 120 may provide a server hello message 720 to UE 110 (e.g., application 410). In response to SubsPar extension 710, content platform 120 may also include a SubsPar extension 725 with server hello message 720. SubsPar extension 725 may provide an acknowledgement that content platform 120 has received the charging code, ports, and time limit in SubsPar extension 710 and that content platform 120 intends to adhere to the settings in SubsPar extension 710. SubsPar extension 725 is described further in connection with FIG. 8B.

FIG. 8B includes an example of format and parameters that may be used for a SubsPar extension 725 in server hello 720. As shown in FIG. 8B, SubsPar extension 725 may include type parameter field 815, a length parameter field 825, and a value field 835. Type parameter field 815 may include, for example, the same dedicated extension type value used for type parameter field 810. Length parameter field 825 may include a length (e.g., number of characters) used in all or part of value field 835. Length parameter field 825 may be the same value or a different value than length parameter field 820.

Value field 835 may include a hash value 836 generated from the action code 831, nonce 832, source ports 833, and timer 834 of value field 830 or another type of digital signature. Hash value 836 may be generated, for example, using a hash algorithm and private key previously exchanged with PGW 235.

Returning again to FIG. 7, PGW 235 may inspect server hello 720 with SubsPar extension 725. PGW 235 may detect SubsPar extension 725 and verify hash 836 using the previously stored parameters from SubsPar extension 710 and the shared private key.

Assuming the digital signature is validated, PGW 235 can act on the information in SubsPar extension 710/SubsPar extension 725 to apply or adjust setting or policy rules 730 for the subscriber. For example, PGW 235 may set up a dynamic charging rule for the session to use the ports identified in source ports 833 and charge data that uses those ports according to action code 831 (e.g., PGW 235 may assign a rating group for traffic to the ports) for the duration of timer 834.

PGW 235 may forward server hello 720 with SubsPar extension 725 to UE 110. After completion of the TLS handshake, content platform 120, as shown at reference 735, may provide a video flow using the requested ports, and PGW 235 may charge data for the video flow according to the parameters for rule 730. Thus, the trusted client application 410 on UE 110 may be used to initiate a rule that is dynamically generated and enforced by PGW 235 (e.g., in contrast with PGW enforcing a stored rule from a PCRF).

To deactivate a pending rule, the trusted client application 410 on UE 110 may initiate communications similar to those described in connection with FIG. 7. For example, if the dynamically generated rule needed to be terminated prior to the expiration of the time value in timer 834, UE 110 may send a new client hello message 705 with a SubsPar extension 710 that resets the value of timer 834 to zero.

The communications and signals explained and illustrated in FIG. 7 are exemplary and may not represent each and every signal that may be exchanged. For example, in implementations where UE 110 (e.g., trusted client application 410) initiates SubsPar extension 710, an application provider (e.g., associated with content platform 120) may typically require separate communications between UE 110 and content platform 120 (or another network device) to authenticate the user of trusted client application 410. Additionally, depending on the implementation of UE 110 and PGW 235, different signals may be used in some instances to provide and enforce subscriber account parameters as described herein.

Figure 9:
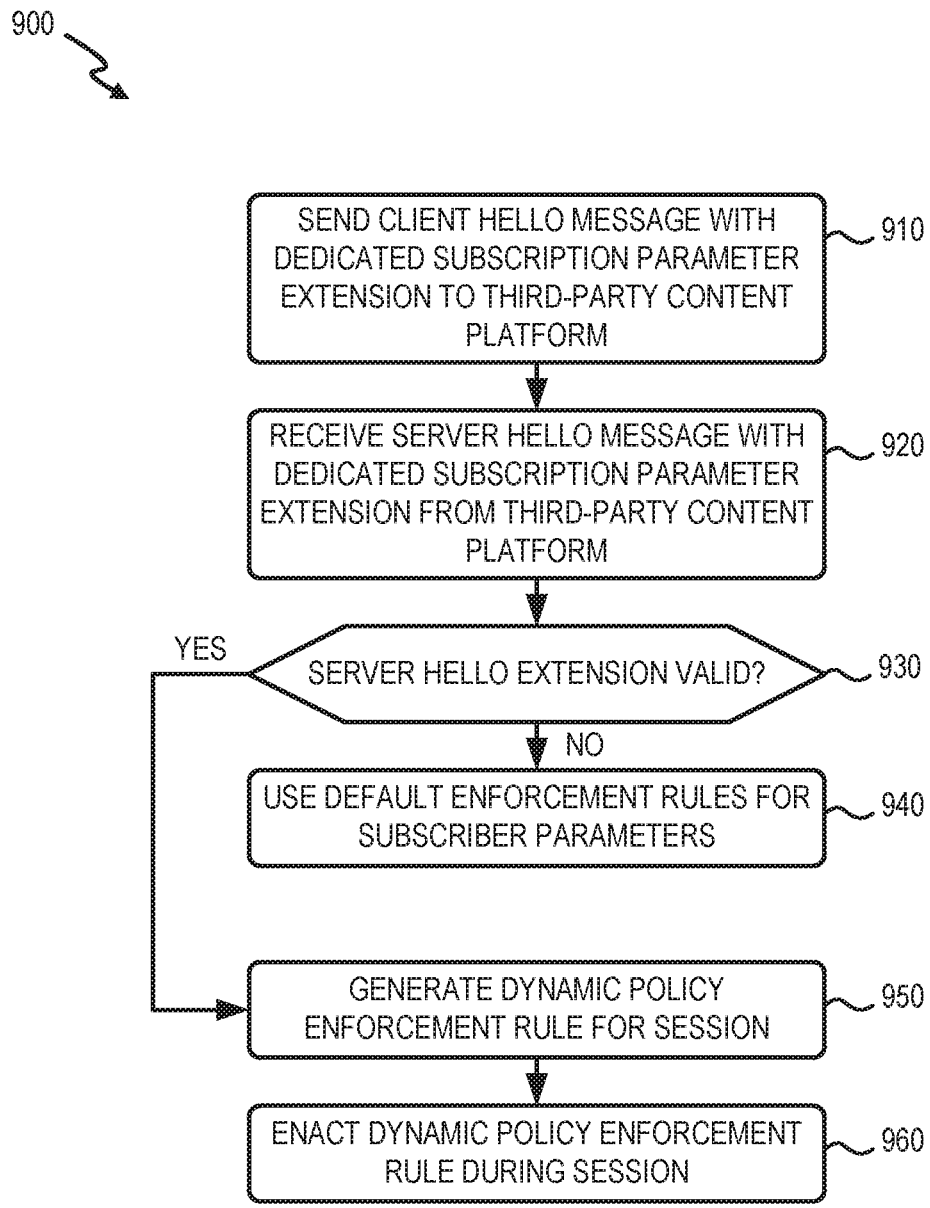
FIG. 9 is a flow diagram illustrating an exemplary process for optimizing enforcement of subscription parameters in a mobile carrier network, according to an implementation described herein.

FIG. 9 is a flow diagram illustrating an exemplary process 900 for optimizing enforcement of subscription parameters in a mobile carrier network, according to an implementation described herein. In one implementation, process 900 may be implemented by PGW 235. In another implementation, process 900 may be implemented by PGW 235 in conjunction with one or more other devices in network environment 100, such as UE 110 or content platform 120. According to still other implementations, process 900 may be implemented by another type of anchor node for packet data network (PDN) connections (e.g., a Gateway General Packet Radio Service (GPRS) Support Node (GGSN), a User Plane Function (UPF), a Mobile Agent, etc.).

Referring to FIG. 9, process 900 may include sending a client hello message with a dedicated subscription parameter extension to a third-party content platform (block 910). For example, in one implementation, PGW 235 may receive client hello message 505 from UE 110, append SubsPar extension 510, and forward client hello message 505 with the append SubsPar extension 510 to content platform 120. In another implementation, PGW 235 may receive client hello message 705 with SubsPar extension 710 from UE 110 and forward client hello message 705 with SubsPar extension 710 to content platform 120.

Process 900 may further include receiving a server hello message with a dedicated subscription parameter extension from the third-party content platform (block 920). For example, in response to client hello message 505 with the appended SubsPar extension 510, PGW 235 may receive server hello message 520 with acknowledgement SubsPar extension 525 from content platform 120. In another implementation, in response to client hello message 705 with the append SubsPar extension 710, PGW 235 may receive server hello message 720 with SubsPar extension 725 from content platform 120.

Process 900 may also include determining if the dedicated subscription parameter extension in the server hello message is valid (block 930). For example, PGW 235 may inspect SubsPar extension 525 to determine if content platform 120 agrees to abide by the subscription parameters in SubsPar extension 510. In one implementation, PGW 235 may validate hash 636 to confirm that content platform 120 received the correct message from PGW 235, and that the SubsPar extension 525 in server hello message 520 was actually generated by content platform 120. In another implementation, PGW 235 may inspect SubsPar extension 725 to determine if content platform 120 agrees to abide by the subscription parameters in SubsPar extension 710.

If the dedicated subscription parameter extension in the server hello message is not valid (block 930—No), process 900 may include using default enforcement rules for the subscriber parameters (block 940). For example, if content platform 120 does not support the extension-based communication or if content platform 120 chooses not to honor the video resolution request in SubsPar extension 510, PGW 235 may apply default rules/policies/user profile information (e.g., obtained from PCRF 240) for throttling or otherwise enforcing video resolution limits for the session Similarly, if content platform 120 chooses not to honor the subscription parameters in SubsPar extension 710, PGW 235 may apply default rules (e.g., obtained from PCRF 240) for charging, metering, or otherwise managing data flows for the session.

If the dedicated subscription parameter extension in the server hello message is valid (block 930—Yes), process 900 may include generating a dynamic policy enforcement rule for the session (block 950) and enacting the dynamic policy enforcement rule during the session (block 960). For example, PGW 235 may remove the throttle value 515 that was applied when client hello message 505 was detected. In one implementation, PGW 235 may generate a dynamic rule (e.g., that overrides a default throttling rule) to stop throttling for the particular session. PGW 235 will then permit content platform 120 to provide a non-throttle video flow with the requested resolution for the subscriber's account. In another implementation, PGW 235 can act on the information in SubsPar extension 710/SubsPar extension 725 to generate dynamic policy rules 730 for the subscriber's session.

Figure 10:
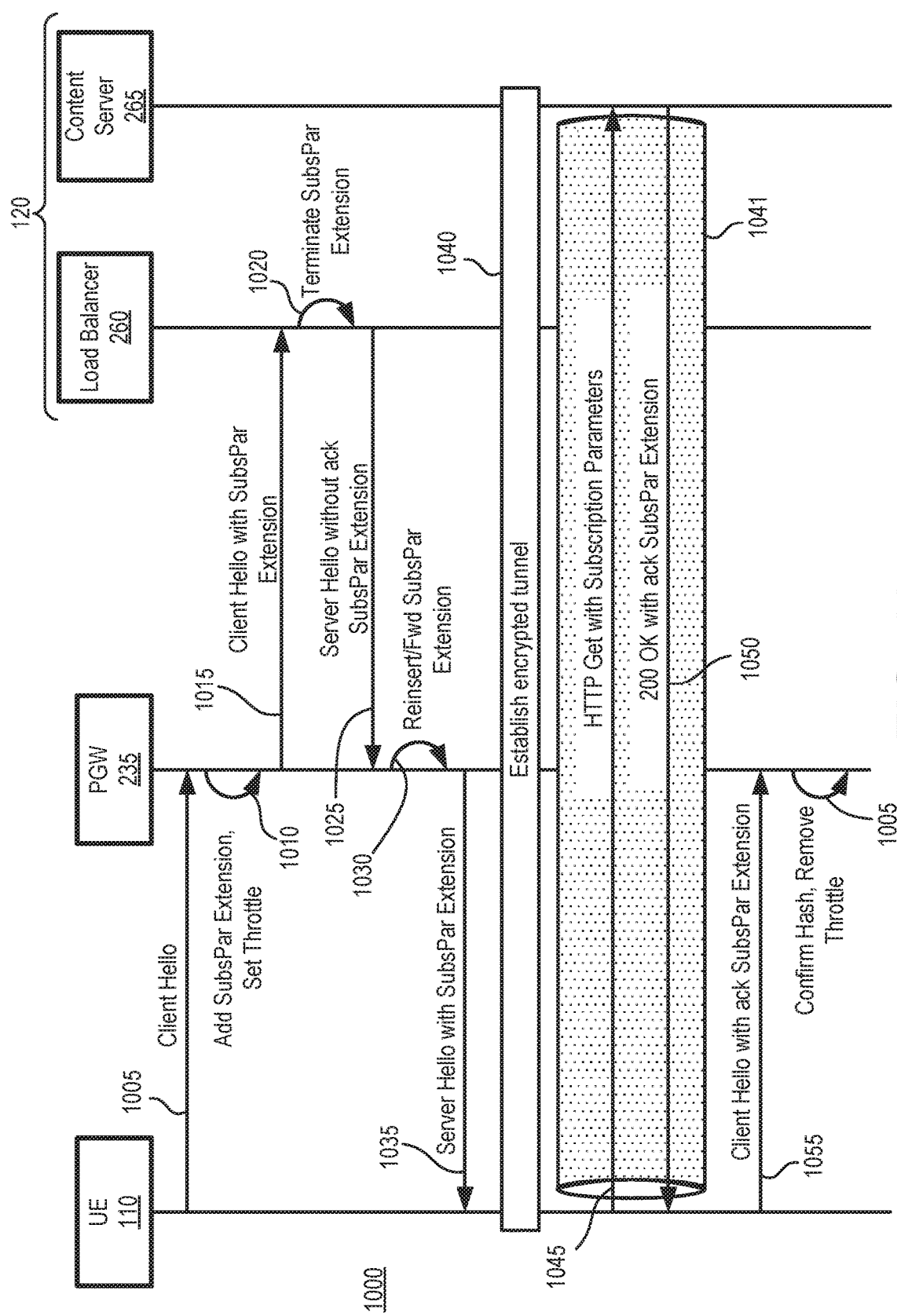
FIG. 10 is a diagram illustrating exemplary communications in a portion of the network environment of FIG. 2, according to another implementation.

FIG. 10 is a diagram illustrating exemplary communications between devices in a portion 1000 of network environment 200. Communications in FIG. 10 represent communications for providing subscriber account parameters from a mobile carrier network device (e.g., PGW 235) to a third party network device (e.g., content platform 120) via a UE 110. As shown in FIG. 10, network portion 1000 may include UE 110, PGW 235, and load balancer 260 and content server 265 of content platform 120.

As shown in FIG. 10, UE 110 (e.g., client application 410) may direct a client hello message 1005 to content platform 120. Client hello message 1005 may be part of a TLS handshake protocol directed to a third-party video service (e.g., content platform 120) as part of a message exchange for a login procedure, a video content request, a content catalog request, etc. Among other information, client hello message 1005 may identify the application (e.g., client application 410) that initiates client hello message 1005.

PGW 235 may inspect packets traversing from UE 110 to content platform 120. At reference 1010, when PGW 235 determines that client hello message 1005 is associated with a particular third-party video application (e.g., client application 410), PGW 235 may obtain (e.g., from PCRF 240) the subscription parameters for the data flow and insert the subscriber's allowed video resolution into a dedicated extension field (referred to herein as a "subscription parameters extension" or "SubsPar extension") that is appended to the client hello message. The SubsPar extension in 1010 may include a same or similar content to that described above for SubsPar extension 510 (e.g., type parameter field 610, a length parameter field 620, and a parameter value field 630 with video resolution 631 and nonce 632). As further shown at reference 1010, PGW 235 may also set a throttle value (e.g., a bandwidth limit) for the subscriber's allowed video resolution.

PGW 235 may forward the client hello message (e.g., an HTTPS hello message) with the SubsPar extension to content platform 120, as shown at reference 1015. Load balancer 260 of content platform 120 may receive the client hello message with the SubsPar extension. However, in contrast with FIG. 5, for example, the SubsPar extension provided by PGW 235 is not forwarded to content server 265. Instead, as shown at reference 1020, load balancer 260 may terminate the SubsPar extension. For example, the load balancer 260 may strip the SubsPar extension (along with other HTTPS extensions) or the HTTPS connection may be terminated at load balancer 260.

At reference 1025, load balancer 260 may respond to PGW 235 with a server hello message that does not include an acknowledgment SubsPar extension (e.g., such described above for SubsPar extension 525 with type parameter field 615, a length parameter field 625, and a parameter value field 635 including a hash 636 of video resolution 631 and nonce 632). Instead, load balancer 260 may provide a server hello message that echoes back the original SubsPar extension (e.g., SubsPar extension 510) or has no extension.

PGW 235 may receive the server hello message (e.g., without the acknowledgment SubsPar extension), and detect the lack of a digital signature (e.g., hash 636). At reference 1030, PGW 235 may reinsert or append the original SubsPar extension generated at reference 1010 if no extension is included in the server hello. Alternatively, PGW may simply forward the server hello message from load balancer 260 with the original SubsPar extension. In either case, at reference 1035, PGW 235 sends a server hello to UE 110 with the original SubsPar extension (e.g., corresponding to SubsPar extension 510). UE 110 may receive the server hello with SubsPar extension from PGW 235.

Using information from the server hello message, at reference 1040, UE 110 may establish an encrypted tunnel (e.g., shown as tunnel 1041) between UE 110 (e.g., client application 410) and content server 265. Using communications within tunnel 1041, application 410 of UE 110 may submit an HTTP GET request 1045 to content server 265 that includes the subscription parameters of the SubsPar extension (e.g., type parameter field 610, a length parameter field 620, and a parameter value field 630 with video resolution 631 and nonce 632).

Content server 265 may receive the HTTP GET request and may use the information in the subscription parameters to set the video resolution for the session. The video resolution may be, for example, a lower resolution than the default resolution for content platform 120. Applying the video resolution 631 and nonce 632 values in parameter value field 630, content server 265 may generate a hash value (e.g., hash 636) using a hash algorithm and private key previously exchanged with PGW 235.

In response to HTTP GET request 1045, content server 265 may provide an OK message 1050 (e.g., an HTTP 200 OK message) to UE 110 (e.g., application 410). OK message 1050 may provide an acknowledgement that content platform 120 has received the mobile carrier's video resolution recommendation (e.g., from GET request 1045) and that content server 265 intends to adhere to the video resolution recommendation. OK message 1050 may include an acknowledgment SubsPar extension (e.g., such described above for SubsPar extension 525 with type parameter field 615, a length parameter field 625, and a parameter value field 635 including the hash 636 of video resolution 631 and nonce 632).

UE 110 (e.g., application 410) may receive OK message 1050 with the acknowledgment SubsPar extension and forward the acknowledgment SubsPar extension to PGW 235. For example, UE 110 may use a client hello message 1055 directed to content platform 120 to forward the acknowledgement SubsPar extension. PGW 235 may receive client hello message 1055, detect the extension value (e.g., from type parameter field 615) and hash value (e.g., hash value 636 from parameter value field 635), and validate the digital signature using the hash algorithm and private key previously exchanged with content platform 120.

Assuming the digital signature is validated, PGW 235 may remove the previously-applied throttle value (from reference 1010). Content server 265 may then provide a non-throttled video flow with the requested resolution for the subscriber's account. If content platform 120 does not support the extension-based communication or if the digital signature is validated, PGW 235 may continue with the normal video throttling procedures (e.g., as set at reference 1010).

The communications and signals explained and illustrated in FIG. 10 are exemplary and may not represent each and every signal that may be exchanged. Additionally, depending on the implementation of UE 110 and PGW 235, different signals may be used in some instances to provide subscriber account parameters as described herein. For example, in another embodiment, PGW 235 may not add a SubsPar extension upon receiving an initial client hello message (e.g., at 1010/1015), and thus a responsive server hello message (e.g., at 1025) would never contain an acknowledgement SubsPar extension.

Figure 11:
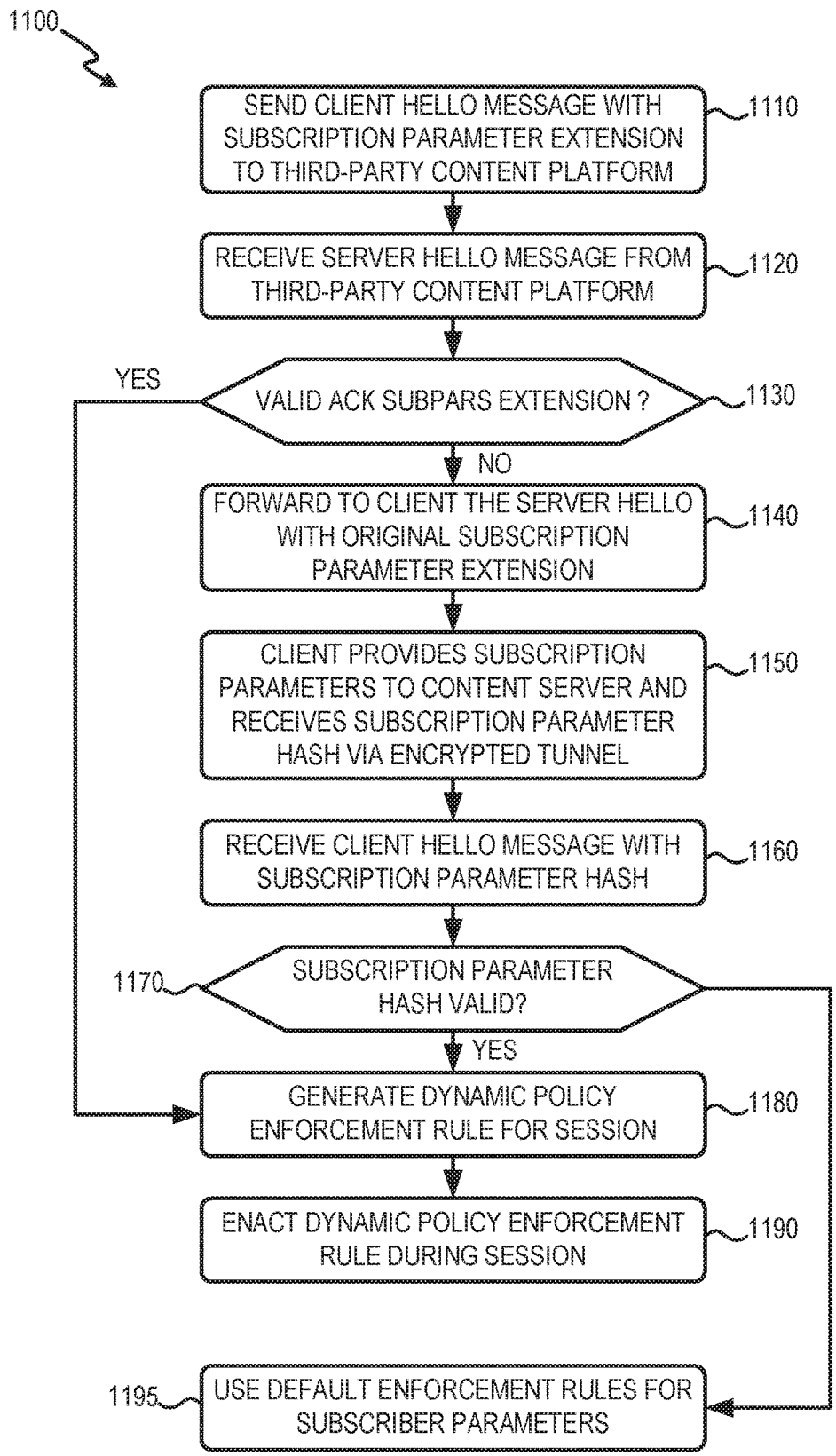
FIG. 11 is a flow diagram illustrating an exemplary process for optimizing enforcement of subscription parameters in a mobile carrier network, according to another implementation described herein.

FIG. 11 is a flow diagram illustrating an exemplary process 1100 for optimizing enforcement of subscription parameters in a mobile carrier network, according to another embodiment described herein. Process 1100 may be implemented by PGW 235. In other implementations, process 1100 may be implemented by PGW 235 in conjunction with one or more other devices in network environment 100, such as UE 110 or devices in content platform 120. According to still other implementations, process 1100 may be implemented by another type of anchor node for packet data network (PDN) connections (e.g., a Gateway General Packet Radio Service (GPRS) Support Node (GGSN), a User Plane Function (UPF), a Mobile Agent, etc.).

Referring to FIG. 11, process 1100 may include sending a client hello message with a subscription parameter extension to a third-party content platform (block 1110). For example, as shown in FIG. 10, PGW 235 may receive a client hello message 1005 from UE 110, append a subscription parameters extension (e.g., SubsPar extension 510), and forward the client hello message with the append subscription parameters extension 510 to content platform 120.

Process 1100 may further include receiving a server hello message from the third-party content platform (block 1120), and determining if the server hello message includes a valid subscription parameter extension (block 1130). For example, in response to the client hello message with the appended SubsPar extension 510, PGW 235 may receive a server hello message from content platform 120. PGW 235 may determine if the server hello message includes a valid acknowledgment SubsPar extension (e.g., acknowledgment SubsPar extension 525 including hash 636).

If the server hello message does not include a valid subscription parameter extension (block 1130—No), process 1100 may include forwarding, to the client application, the server hello message with the original subscription parameter extension (block 1140), and causing the client application to provide the subscription parameters to the content server, and to receive a subscription parameter hash from the content server, via an encrypted tunnel (block 1150). For example, PGW 235 may insert the original SubsPar extension (e.g., SubsPar extension 510), and forward the server hello message with the append subscription parameters extension 510 to UE 110. Upon receiving the server hello message, client application 410 of UE 110 may establish a secure tunnel with content server 265 and send a get request including the subscription parameters to content server 265. Content server 265 may, in response, provide an OK message with an acknowledgement SubsPar extension, which includes hash 636.

Process 1100 may also include receiving a client hello message with the subscription parameter hash (block 1160) and determining if the subscription parameter hash is valid (block 1170). For example, UE device 110 may send a client hello message directed to content platform 120 to forward the acknowledgement SubsPar extension that was generated by content server 265. PGW 235 may receive the client hello message, detect the extension value (e.g., from type parameter field 615) and hash value (e.g., hash value 636 from parameter value field 635), and validate the digital signature using a hash algorithm and private key previously exchanged with content platform 120.

If the subscription parameter hash in the client hello message is valid (block 1170—Yes), or if the server hello message includes a valid subscription parameter extension (block 1130—Yes), process 1100 may include generating a dynamic policy enforcement rule for the session (block 1180) and enacting the dynamic policy enforcement rule during the session (block 1190). For example, PGW 235 may remove the throttle value 1010 that was applied when client hello message 1005 was detected. In one implementation, PGW 235 may generate a dynamic rule (e.g., that overrides a default throttling rule) to stop throttling for the particular session. PGW 235 will then permit content platform 120 (e.g., content server 265) to provide a non-throttle video flow with the requested resolution for the subscriber's account.

If the subscription parameter has in the client hello message is not valid (block 1170—No), process 1100 may include using default enforcement rules for the subscriber parameters (block 1195). For example, if client hello message 1055 includes an invalid hash or no hash, PGW 235 may determine that content platform 120 does not support the extension-based communication or that content platform 120 chooses not to honor the video resolution requested in the subscription parameters (e.g., SubsPar extension 510). Thus, PGW 235 may apply default rules/policies/user profile information (e.g., obtained from PCRF 240) for throttling or otherwise enforcing video resolution limits for the session.

Systems and methods described herein enable alternate communications to communicate subscriber parameters to a third-party content platform. A network device for a mobile carrier network sends, to a third-party platform, a first client message including a first parameter extension. The first parameter extension indicates subscription parameters for a data flow between a user equipment (UE) device that originated the client message and the third-party platform. The network device receives, from the third-party platform, a server message. The server message does not include a confirmation that the third-party platform will abide by subscription parameters. The network device forwards, to the UE device, the server message with the first parameter extension. The network device receives, from the UE device, a second client message including a second parameter extension. The second parameter extension confirms that the third-party platform will abide by the one or more subscription parameters. The network device then generates, based on the one or more subscription parameters, a policy enforcement rule for the data flow that relies on the confirmation from the third-party platform.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 9 and 11, and message/operation flows with respect to FIGS. 5, 7, and 10, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   sending, by a network device in a network to a third-party content platform, a first client message originated by a user equipment (UE) device, the first client message including a first subscription parameter extension, wherein the first subscription parameter extension indicates one or more subscription parameters for a data flow between the UE device and the third-party content platform;
   receiving, by the network device from the third-party content platform, a server message, wherein the server message does not include a confirmation that the third-party content platform accepts the one or more subscription parameters;
   forwarding, by the network device to the UE device, the server message with the first subscription parameter extension;
   receiving, by the network device from the UE device, a second client message including a second subscription parameter extension, wherein the second subscription parameter extension confirms that the third-party content platform accepts the one or more subscription parameters;
   generating, by the network device based on the one or more subscription parameters, a policy enforcement rule for the data flow that relies on the confirmation from the third-party content platform; and
   applying, by the network device, the policy enforcement rule to the data flow between the UE device and the third-party content platform.

2. The method of claim 1, wherein the network device includes a packet data network gateway (PGW) and the network includes an evolved packet core network.

3. The method of claim 1, wherein, sending further comprises:
   generating, by the network device, the first subscription parameter extension; and
   appending the first subscription parameter extension to the first client message.

4. The method of claim 1, wherein forwarding the server message further comprises:
   appending the first subscription parameter extension to the server message.

5. The method of claim 1, further comprising:
   validating, by the network device, the second subscription parameter extension.

6. The method of claim 1, wherein the first subscription parameter extension includes a unique extension type identifier and a parameter value field that includes a video resolution value and a nonce.

7. The method of claim 1, wherein the second client message includes a handshake initialization message addressed to the third-party content platform.

8. The method of claim 1, wherein the second subscription parameter extension includes a unique extension type identifier and a digital signature generated by the content platform.

9. The method of claim 1, wherein forwarding the server message with the first subscription parameter extension causes the UE device to send a message to a content server device for the third-party content platform, the message to the content server device including the one or more subscription parameters of the first subscription parameter extension.

10. The method of claim 9, wherein the UE device receives the second subscription parameter extension in response to the message to the content server, and
    wherein receiving the second subscription parameter extension from the content server causes the UE device to send the second client message.

11. A network device, comprising:
    one or more memories to store instructions; and
    one or more processors to execute the instructions to:

send, to a third-party content platform, a first client message originated by a user equipment (UE) device, the first client message including a first subscription parameter extension, wherein the first subscription parameter extension indicates one or more subscription parameters for a data flow between the UE device and the third-party content platform;

receive, from the third-party content platform, a server message, wherein the server message does not include a confirmation that the third-party content platform accepts the one or more subscription parameters;

forward, to the UE device, the server message with the first subscription parameter extension;

receive, from the UE device, a second client message including a second subscription parameter extension, wherein the second subscription parameter extension confirms that the third-party content platform accepts the one or more subscription parameters;

generate, based on the one or more subscription parameters, a policy enforcement rule for the data flow that relies on the confirmation from the third-party content platform; and apply the policy enforcement rule to the data flow between the UE device and the third-party content platform.

12. The network device of claim 11, wherein the network devices includes a packet data network gateway (PGW) and the network includes an evolved packet core network.

13. The network device of claim 11, wherein the one or more processors are further to execute the instructions to:
receive the first client message from the UE device;
generate the first subscription parameter extension; and
append the first subscription parameter extension to the first client message.

14. The network device of claim 11, wherein, when forwarding the server message, the one or more processors are further to execute the instructions to:
append the first subscription parameter extension to the server message.

15. The network device of claim 11, wherein the one or more processors are further to execute the instructions to:
validate the second subscription parameter extension.

16. The network device of claim 11, wherein the second client message includes a client hello message addressed to the third-party content platform.

17. The network device of claim 11, wherein the second subscription parameter extension includes a unique extension type identifier and a digital signature generated by a content server of the content platform.

18. A non-transitory computer-readable medium containing instructions executable by at least one processor, the computer-readable medium comprising one or more instructions to:

send, to a third-party content platform, a first client message originated by a user equipment (UE) device, the first client message including a first subscription parameter extension, wherein the first subscription parameter extension indicates one or more subscription parameters for a data flow between the UE device and the third-party content platform;

receive, from the third-party content platform, a server message, wherein the server message does not include a confirmation that the third-party content platform accepts the one or more subscription parameters;

forward, to the UE device, the server message with the first subscription parameter extension;

receive, from the UE device, a second client message including a second subscription parameter extension, wherein the second subscription parameter extension confirms that the third-party content platform accepts the one or more subscription parameters; and generate, based on the one or more subscription parameters, a policy enforcement rule for the data flow that relies on the confirmation from the third-party content platform.

19. The non-transitory computer-readable medium of claim 18, wherein the instructions to forward the first client message further comprise one or more instructions to:
add the first subscription parameter extension to the server message.

20. The non-transitory computer-readable medium of claim 18, wherein the second subscription parameter extension includes a unique extension type identifier and a digital signature generated by the content platform.

* * * * *